June 13, 1939.                F. J. BOLDUSOFF                2,162,240
                              DENTAL FLOSS HOLDER
                              Filed Dec. 14, 1937
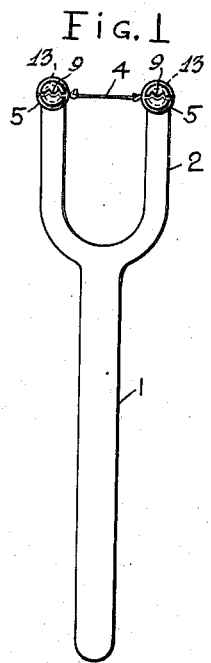
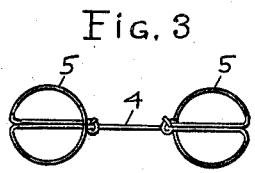
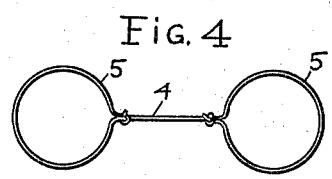
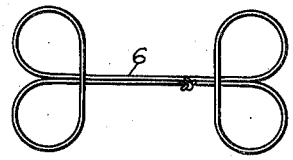
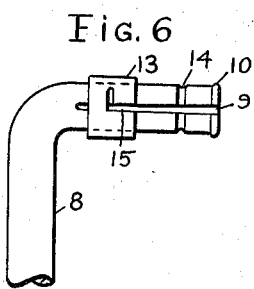
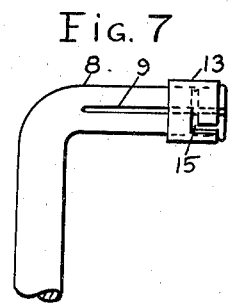
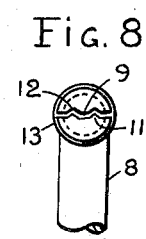
FRED J. BOLDUSOFF
INVENTOR
BY John P. Nikronov
ATTORNEY Patented June 13, 1939

2,162,240

UNITED STATES PATENT OFFICE 2,162,240

DENTAL FLOSS HOLDER

Fred J. Boldusoff, Bridgeport, Conn.

Application December 14, 1937, Serial No. 179,635

3 Claims. (Cl. 132—91)

My invention relates to dental floss holders and has particular reference to holders for silk floss or yarn used for cleaning teeth.

It is well known that silk floss represents the best means for cleaning narrow spaces between successive teeth where tooth brush cannot be used effectively. The floss is usually held between fingers and moved back and forth between the teeth. This operation cannot be carried successfully unless the floss is stretched tightly between fingers. In many cases, however, the fingers cannot be moved with sufficient freedom in the mouth, and then it becomes necessary to use a mechanical floss holder.

My invention has for its object therefore to provide such a mechanical holder in the form of a fork, the floss being stretched between the prongs or tines of the fork.

Another object of my invention is to provide already prepared pieces of floss with loops on the ends so that they can be easily and quickly slipped over the ends of the fork, the latter being made of a resilient material and drawn together when the floss loops are fitted on the prongs, so that the floss becomes tightly stretched when the prongs are released. Such looped pieces of floss can be prepared in quantities by special machines to be supplied to users of my floss holders, eliminating the necessity to tie pieces of floss to the prongs and to make knots on them.

Another object of my invention is to provide mechanical clamping devices on the ends of the fork prongs whereby pieces of floss can be held without making any knots or specially tying them.

For this purpose I provide slots in the ends of the fork prongs with teeth or serrations inside adapted to engage the ends of a piece of floss. The prongs are preferably made of a resilient material and are provided with sliding sleeves for drawing the ends at the sides of the slots together thereby clamping the floss therebetween. I provide resilient clamps which hold the floss by their resiliency and can be manually released for inserting the floss.

My invention is more fully described in the accompanying specification and drawing in which—

Fig. 1 is a front view of my holder with a piece of floss fitted on the ends of the fork.

Fig. 2 is a side view of the same.

Fig. 3 is a view of a prepared piece of floss in its position on the ends of the fork, shown on an enlarged scale.

Fig. 4 is a similar view of the same piece of floss before it is fitted on the holder.

Fig. 5 is a similar view of a modified arrangement of the floss.

Fig. 6 is a fractional enlarged view of the ends of the fork with a mechanical clamping device for holding the floss.

Fig. 7 is a similar view showing the floss clamped in its operative position.

Fig. 8 is an end view of the same.

My floss holder consists of a handle 1 with a fork 2 consisting of two parallel prongs bent in the middle at right angles as shown in Fig. 2. The ends of the prongs have slots 9 for a piece of dental silk floss 4. The ends of the piece 4 are tied into loops 5 are doubled over upon themselves and fitted in the slots 9 on the ends of the prongs at the sides of the slots 9 as shown in Fig. 3. The prongs are made of a resilient material and are drawn together for fitting the loops 5 so that the floss becomes stretched tight when the prongs are released. The looped pieces of floss can be prepared on a suitable machine in large quantities to be supplied with the holders thereby greatly simplifying their use since the user is relieved of a tedious and slow work of tying the knots on the pieces of floss.

A modified piece 6 of floss is shown in Figs. 4 and 5, the floss being doubled throughout its length so that a single knot is sufficient.

The ends of the prongs may have circumferential grooves 14 for the floss in order to retain it in its place and to prevent its sliding off the prongs.

The construction for holding the floss is shown in Figs. 6, 7 and 8. The ends of the prongs 8 have long slots 9 with a slightly expanded portion or circumferential rib 10 on the end. The slot is made in a zig-zag or angular shape inside one side being provided with teeth 11 and the other side with corresponding grooves 12 as shown in Fig. 8 in order to clamp the floss between them. Collars 13 are resiliently pushed over the ribs 10 on the prongs and can be moved along the ends from the inoperative position shown in Fig. 6 to the operative position of Fig. 7.

The sleeve or collar 13 has an angular slot 15 at one side for the floss. The end of the floss is inserted into the slot 9 and turned around in the groove 14. The collar 13 is then moved toward the end of the prong causing its portions to be drawn together thereby clamping the floss in the slot between the teeth 11 and grooves 12. The collar is moved until the floss reaches the end of the straight or axial portion of the slot 15 and the collar is then turned causing the floss to enter the circumferntial portion of the slot 15 thereby retaining the floss in its place and preventing its sliding off of the end of the prongs.

I claim as my invention:

1. A dental floss holder comprising a handle, a fork with prongs on the end of the handle, the ends of the prongs having slots with internal teeth for engaging a floss, and means to draw the ends of the slotted portions against the floss in the slots for clamping the latter.

2. A dental floss holder comprising a handle, a fork on the handle having prongs, the ends of the prongs being slotted for a floss and provided with internal teeth at one side of the slots and corresponding grooves at the other side for clamping the floss, and a sliding collar on each of the prongs, the collar having a slot for the floss.

3. A dental floss holder comprising a handle, a fork on the handle having prongs, the ends of the prongs being slotted for a floss, and a sliding collar on each of the prongs adapted to clamp the floss in the slot when moved toward the end of the prong, the collar having an angular slot adapted to retain the floss in its position when the collar is turned on the prong so as to place the floss into the internal angular portion of the slot.

FRED J. BOLDUSOFF.